US010584042B2

(12) United States Patent
Emmerich et al.

(10) Patent No.: US 10,584,042 B2
(45) Date of Patent: Mar. 10, 2020

(54) STANDALONE HUMIDIFICATION-DEHUMIDIFICATION WATER PURIFICATION METHOD AND SYSTEM

(71) Applicant: T.S.D. DESALINATION LTD, Tel Aviv (IL)

(72) Inventors: Ziev Yosef Emmerich, Cambridge (GB); Moshe Tshuva, Tel Aviv (IL); Joshua Altman, Tel Aviv (IL)

(73) Assignee: T.S.D. DESALINATION LTD, Tel Aviv (IL)

( * ) Notice: Subject to any disclaimer, the term of this patent is extended or adjusted under 35 U.S.C. 154(b) by 480 days.

(21) Appl. No.: 15/007,247

(22) Filed: Jan. 27, 2016

(65) Prior Publication Data
US 2017/0210638 A1     Jul. 27, 2017

(51) Int. Cl.
*B01D 3/34* (2006.01)
*C02F 1/14* (2006.01)
(Continued)

(52) U.S. Cl.
CPC .............. *C02F 1/14* (2013.01); *B01D 1/0035* (2013.01); *B01D 1/0047* (2013.01); *B01D 3/346* (2013.01);
(Continued)

(58) Field of Classification Search
CPC ....... B01D 1/0035; B01D 1/0047; C02F 1/10; C02F 1/14; C02F 2301/02; Y02A 20/212
See application file for complete search history.

(56) References Cited

U.S. PATENT DOCUMENTS 2,032,182 A * 2/1936 Oman ...................... B01D 1/22
                                            159/16.1
3,345,272 A * 10/1967 Collins ..................... C02F 1/10
                                            203/11
(Continued)

FOREIGN PATENT DOCUMENTS

EP         1770068       4/2007
ES         2110914 A1    2/1998
(Continued)

OTHER PUBLICATIONS

Extended European Search Report, Application No. 17743847.0, dated May 29, 2019, 9 pages.

*Primary Examiner* — Youngsul Jeong
*Assistant Examiner* — Gabriel E Gitman
(74) *Attorney, Agent, or Firm* — The Roy Gross Law Firm, LLC; Roy Gross

(57) ABSTRACT

A humidification-dehumidification water purification system and method is disclosed. The system comprises a plurality of evaporator/condenser units and heat exchanger, preferably a solar collector. Contaminated water flows through successive condenser stages to the heat exchanger, and from there through successive evaporator stages. A flow of air is directed through successive evaporator stages in the direction opposite to the flow of water, where it is humidified by water vapor evaporating from the water. The humidified air passes through the successive condenser stages, where it is cooled, thereby condensing pure water and dehumidifying the air. The pure water is extracted from the system, and the dehumidified air can be recirculated through the system. In preferred embodiments of the invention, the evaporator/condenser units are stacked beneath the solar collector, and the system is fully portable and modular and can be either land- or water borne.

21 Claims, 5 Drawing Sheets

(51) Int. Cl.
 *B01D 1/00* (2006.01)
 *C02F 1/10* (2006.01)
(52) U.S. Cl.
 CPC ............ *C02F 1/10* (2013.01); *C02F 2301/02* (2013.01); *Y02A 20/212* (2018.01)

(56) References Cited

U.S. PATENT DOCUMENTS

| | | | |
|---|---|---|---|
| 4,172,767 | A | 10/1979 | Sear |
| 4,187,151 | A | 2/1980 | Hanning |
| 4,219,387 | A | 8/1980 | Gruntman |
| 4,595,459 | A * | 6/1986 | Kusakawa ............ B01D 3/346 202/177 |
| 6,494,995 | B1 | 12/2002 | Battah |
| 2002/0166758 | A1 | 11/2002 | Vinz |
| 2005/0121304 | A1 | 6/2005 | Beckman |
| 2010/0307910 | A1 * | 12/2010 | Engelhart ............ B01D 1/0035 203/21 |
| 2014/0197022 | A1 | 7/2014 | Antar et al. |
| 2015/0047963 | A1 * | 2/2015 | Roch .................... B01D 3/007 202/185.1 |

FOREIGN PATENT DOCUMENTS

| | | |
|---|---|---|
| GB | 2094951 | 9/1982 |
| JP | 61291093 A | 12/1986 |

* cited by examiner

STANDALONE HUMIDIFICATION-DEHUMIDIFICATION WATER PURIFICATION METHOD AND SYSTEM

FIELD OF THE INVENTION

This invention is directed in general toward means and methods for purifying unpotable water (e.g. saltwater, brackish water, etc.). More specifically, it is directed to means and methods for purifying unpotable water that use solar energy.

BACKGROUND OF THE INVENTION

Freshwater shortage is an escalating global problem, which is being exacerbated by global climate change, particularly the ever-expanding arid equatorial region, and by pollution of freshwater sources in rapidly industrializing emerging economies.

Existing methods of water treatment and desalination tend to have high costs associated with the infrastructure required to construct and maintain water treatment plants and with the energy required to run them. One approach to solving this problem has been the development of humidification-dehumidification (HDH) systems, in which water is evaporated and then re-condensed. HDH systems can be designed to use solar energy, an environmentally friendly and inexpensive energy source that is abundant in hot and arid areas. HDH desalination uses separate components for each of the thermodynamic processes in water purification, thereby allowing each component to be designed independently and allowing much greater flexibility in the design of the thermodynamic cycle used for evaporating water and then condensing the water vapor back into liquid water.

Japan Pat. Appl. Pub. No. 61-291093 discloses an apparatus for desalination of sea water. The apparatus comprises a container in which, when irradiated by solar radiation through a transparent plate, solar heat is efficiently absorbed by a thin layer of sea water on a heat absorbing heat insulating film. The temperature of the sea water at that part is effectively raised, generating steam having a pressure corresponding to the saturated steam pressure at that temperature. A fan draws a mixture of this steam and air into a suction pipe and from there into a condensing pipe group. Because the condensing pipe group is sufficiently low in temperature compared with the surface of the sea water layer present above the film, part of steam introduced into the condensing pipe group is condensed, generating fresh water which is, in turn, sent to a water storage tank.

U.S. Pat. No. 4,172,767 discloses a water purification system that is placed within a source of impure water. The system comprises a container for holding impure water, an upper portion of which is above the surface of the source of impure water; a cover of flexible plastic for the container, which causes heat from solar radiation impinging thereon to accumulate in the container, thus vaporizing water within; cloth covered baffles in the upper portion of the container for increasing the evaporation area; a blower for moving vapor across the upper portion of the container; a vapor pipe for receiving and transporting vapor from an area of one natural temperature through an area of a lower natural temperature, thereby condensing the vapor; and a pipe and a pump for transporting the condensed water to a storage tank.

U.S. Pat. No. 4,187,151 discloses a desalination device. The device comprises a base with a transparent or translucent chamber that floats on the surface of a body of salt water. Waves cause the chamber to expand and contract, and valves cause air to be pumped through the chamber. The moisture-laden air leaving the chamber is led to a condensation and collection tank below the level of the water.

U.S. Pat. No. 4,219,387 discloses a still a solar still adapted to float on a body of water. The still comprises a toroidal evaporating chamber with sunlight admitting and absorbing, respectively, top and bottom walls for vaporizing water from the body admitted to overlie the bottom wall. A surrounding inner float ring and underlying toroidal inflatable float support the chamber. A condenser depends from and communicates with the evaporating chamber through elongate coaxial vapor outlet and air return tubes, and in turn supplies distillate to a pendent holding tank. A rotatable shaft extending coaxially down through the evaporating chamber carries a fan to propel vapor from the evaporating chamber into the condenser due to rotation of a windmill atop the chamber. A curved reflector is rotatably driven atop the inner ring to direct additional sunlight on the evaporating chamber as the sun moves overhead. An outer float ring loosely coaxially surrounds the inner float ring. The annular water surface between the float rings, covered by a transparent film, forms an oxygen production zone occupiable by oxygen producing phytoplankton fed by nutrients in water brought up from beneath the thermocline by thermosiphon flow between the warm condenser and a surrounding heat skirt. Pump units mounted on the outer float ring remove distilled water and any oxygen produced, the latter for example to a device for dissolving the oxygen below the thermocline in the body of water.

U.S. Pat. No. 6,494,995 discloses a desalination device, A solar cell floats over a body of saline water. A submerged fresh water collection system underlies the cell. A partial vacuum is created in the solar cell for drawing water vapor from the cell to the collection system. Water vapor is condensed in a condenser disposed between the cell and the collection system. Heat generated by the condensation of water vapor is utilized to heat the salt water, which rises upwardly to replace the salt water vaporized in the cell.

Spanish Pat. No. 2110914 discloses a system for desalinating sea water and generating electrical energy using solar energy as heat source. A reflector assembly is formed by parabolic mirrors captures the solar energy in the boiler, where the water is converted into steam which, either directly or after converting the pressure thereof into electrical energy in a turbogenerator, is converted in a chiller into drinking water which accumulates in a tank. The mirror/boiler/chiller assembly is on a rotary platform above the pool which serves, at one and the same time, as reservoir, boiler base and chiller.

U.S. Pat. Appl. Pub. No. 2014/0197022 discloses a solar-powered HDH desalination system that includes a supply of saline or brackish water that passes through a dehumidifier/condenser. The saline or brackish water is preheated in the dehumidifier/condenser as a result of its condensation. A plurality of humidifying stages includes humidifiers and associated solar collectors. The solar collectors heat air, and the heated air then passes through a series of humidifiers to evaporate the preheated saline or brackish water, thereby separating pure water from the brine. The humid air is reheated and recirculated through the humidifying stages and the dehumidifier, and the desalinated water from the dehumidifier via condensation is collected and processed. The system recirculates the brine successively from each humidifier to the next for more efficient evaporation of the water and to lower energy consumption.

It can be seen from the preceding discussion that the systems known in the art lack important desirable features such as portability, modularity, low construction and maintenance costs, and high efficiency to allow energy-efficient production of fresh water from sources such as salt water, brackish water, or black water, at a reasonable cost and without a requirement that the water purification unit be physically located within the source of contaminated water. Thus, development of a system that meets these requirements remains a long-felt but as yet unmet need.

SUMMARY OF THE INVENTION

The present invention is designed to meet this need. The invention comprises a method for purifying contaminated water and a system on which the method can be performed. The method involves passing the contaminated water through a series of evaporator/condenser units. Contaminated water enters the system through the first of the condenser stages and then flows sequentially through the remaining ones to a solar water heater. The solar-heated contaminated water then flows sequentially through a series of evaporator stages, where it contacts a counter-flowing stream of air, until it exits the system. Some of the water evaporates in the evaporator stages, where it humidifies the air flowing through the evaporator stages, and is carried by the stream of humidified air sequentially through the remaining evaporator units and then through conduits passing through the condenser stages. The humid air cools as it flows through the condenser stages, whereupon at least some of the water vapor condenses out; the resulting purified water then flows to a collector or pure water exit.

It is therefore an object of the present invention to disclose a humidification-dehumidification (HDH) water purification system, comprising: (a) a water flow subsystem comprising a system water inlet 600; a system water outlet 500; a plurality of evaporator/condenser units, each of which comprises a condenser stage 1010, an evaporator stage 1020, and a divider 1030 disposed between said condenser stage and said evaporator stage; at least one heat exchange means 200 configured to transfer heat generated external to said water purification system to a fluid in thermal contact with said heat exchange means; and, collecting means 400 configured for collecting purified water; and, (b) an air circulation subsystem in fluid connection with said collecting means. It is within the essence of the invention wherein (a) said water circulation subsystem is configured such that said evaporator/condenser units and said heat exchange means are interconnected so as to conduct water from said system water inlet through said condenser stages to said heat exchange means and then from said heat exchange means sequentially through said evaporator stages to said system water outlet; (b) said air circulation subsystem is configured to circulate air sequentially through said evaporator stages in a direction opposite to a direction in which said water circulation system is configured to conduct water and such that air flowing through said evaporator stages can make physical contact with water being conducted through said evaporator stages, and then sequentially through said condenser stages; and, (c) said collecting means are interconnected with said air circulation system so as to conduct said purified water from said condenser stages to said collecting means.

It is a further object of this invention to disclose the HDH water purification system as defined above, wherein (a) said plurality of evaporator/condenser units comprises a first evaporator/condenser unit 100 connected to said system water inlet and said system water outlet; at least one intermediate evaporator/condenser unit 110; and a final evaporator/condenser unit 120 in fluid connection with said heat exchange means; (b) said air circulation subsystem comprises: a blower 300; and a conduit 3000 passing through each of said condenser stages and in fluid connection with said blower such that said blower is configured to direct a flow of air sequentially through each evaporator stage from said first evaporator/condenser unit through said final evaporator/condenser unit and then sequentially through each of said conduits from said final evaporator/condenser unit to said first evaporator/condenser unit; (c) said collecting means for collecting purified water are in fluid connection with a downstream end of said conduit passing through said condenser stage of said first evaporator/condenser unit; and, (d) said evaporator/condenser units and said heat exchange means are interconnected so as to conduct water through said HDH water purification system from said system water inlet sequentially through said condenser stages of said evaporator/condenser units from said first evaporator/condenser unit to said final evaporator/condenser unit, from said final evaporator/condenser unit to said heat exchange means, from said heat exchange means sequentially through said evaporator stages of said evaporator/condenser units, from said final evaporator/condenser unit to said first evaporator/condenser unit, and from said first evaporator/condenser unit to said system water outlet.

It is a further object of this invention to disclose the HDH water purification system as defined in any of the above, wherein said each of condenser stages comprises: (a) a conduit 3000 for conducting air; (b) at least one condenser water duct 3020 disposed along at least one side of said conduit; (c) a thin barrier 3030 between said conduit and said condenser water duct, said thin barrier configured to prevent physical contact but to allow thermal contact between air in said conduit and water in said condenser water duct; and, (d) an insulating layer 3040 disposed on a side of said condenser water duct away from said conduit, thereby creating along with said thin barrier a duct through which water can flow.

It is a further object of this invention to disclose the HDH water purification system as defined in any of the above, wherein said heat exchange means comprises at least one solar collector configured to utilize solar radiation impinging thereon to heat a fluid.

It is a further object of this invention to disclose the HDH water purification system as defined in any of the above, wherein said evaporator/condenser units are configured in a stack beneath said heat exchange means.

It is a further object of this invention to disclose the HDH water purification system as defined in any of the above, wherein said conduits are oriented at an angle relative to a surface upon which said system is resting such that condensed water vapor flows through said conduits under the force of gravity.

It is a further object of this invention to disclose the HDH water purification system as defined in any of the above, wherein said air circulation subsystem is a closed-loop system.

It is a further object of this invention to disclose the HDH water purification system as defined in any of the above, wherein at least one stage selected from the group consisting of said evaporator stages and said condenser stages is configured so as to conduct air and water through said at least one stage in a serpentine path.

It is a further object of this invention to disclose the HDH water purification system as defined in any of the above, wherein except for said blower, said system is constructed of plastic.

It is a further object of this invention to disclose the HDH water purification system as defined in any of the above, wherein said system is a standalone unit that is configured to operate remote from a source of contaminated water.

It is a further object of this invention to disclose a method for purifying contaminated water, comprising: (a) flowing contaminated water through a plurality of condenser stages to a heat exchange means configured to transfer heat to a fluid in thermal contact with said heat exchange means; (b) flowing said contaminated water through said heat exchange means; (c) flowing said contaminated water from said heat exchange means through a plurality of evaporator stages; (d) flowing air through said evaporator stages in a direction opposite to the flow of said contaminated water; (e) entraining water vapor evaporated by said contaminated water in said evaporator stages in said air, thereby creating humidified air; (f) flowing said humidified air through said condenser stages via enclosed conduits passing therethrough in a direction opposite to the flow of contaminated water therethrough, thereby cooling said air, condensing at least a part of said water vapor entrained therein as purified liquid water, and creating dehumidified air; and, (g) collecting said purified liquid water.

It is a further object of this invention to disclose a method as defined above, wherein: (a) said step of flowing contaminated water through a plurality of condenser stages to a heat exchange means comprises flowing contaminated water through a plurality of condenser stages to a solar collector; (b) said step of flowing said contaminated water through said heat exchange means comprises flowing said contaminated water through said solar collector; and, (c) said step of flowing said contaminated water from said heat exchange means through a plurality of evaporator stages comprises flowing said contaminated water from said solar collector through a plurality of evaporator stages.

It is a further object of this invention to disclose a method as defined in any of the above, further comprising orienting said conduits at an angle relative to a surface upon which said system is resting such that said purified liquid water flows through said conduits under the force of gravity.

It is a further object of this invention to disclose a method as defined in any of the above, further comprising configuring said evaporator/condenser units in a stack beneath said heat exchange means.

It is a further object of this invention to disclose a method as defined in any of the above, wherein said step of flowing contaminated water through a plurality of condenser stages to a heat exchange means configured to transfer heat to a fluid in thermal contact with said heat exchange means comprises flowing said contaminated water through a condenser stage comprising: (a) at least one condenser water duct 3020 disposed along at least one side of said conduit; (b) a thin barrier 3030 between said conduit and said condenser water duct, said thin barrier configured to prevent physical contact but to allow thermal contact between air in said conduit and water in said condenser water duct; and, (c) an insulating layer 3040 disposed on a side of said condenser water duct away from said conduit, thereby creating along with said thin barrier a duct through which water can flow.

It is a further object of this invention to disclose a method as defined in any of the above, further comprising orienting said stacked evaporator/condenser units at an angle relative to a surface upon which said system is resting such that condensed water vapor flows through said conduits under the force of gravity.

It is a further object of this invention to disclose a method as defined in any of the above, further comprising recirculating at least part of said dehumidified air through said evaporator stages.

It is a further object of this invention to disclose a method as defined in any of the above, further comprising configuring at least one stage selected from the group consisting of said evaporator stages and said condenser stages such that flow through said stage will follow a serpentine path.

It is a further object of this invention to disclose a method as defined in any of the above, wherein all steps of said method are performed remote from a source of contaminated water.

It is a further object of this invention to disclose a method as defined in any of the above, further comprising providing evaporator/condenser units characterized by an evaporator stage, a condenser stage, and a divider disposed between said evaporator stage and said condenser stage.

It is a further object of this invention to disclose such a method as defined in any of the above, performed on the system as defined in any of the above.

BRIEF DESCRIPTION OF THE DRAWINGS

The invention will now be described with reference to the drawings, wherein.

DETAILED DESCRIPTION OF THE PREFERRED EMBODIMENTS

Figure 1:
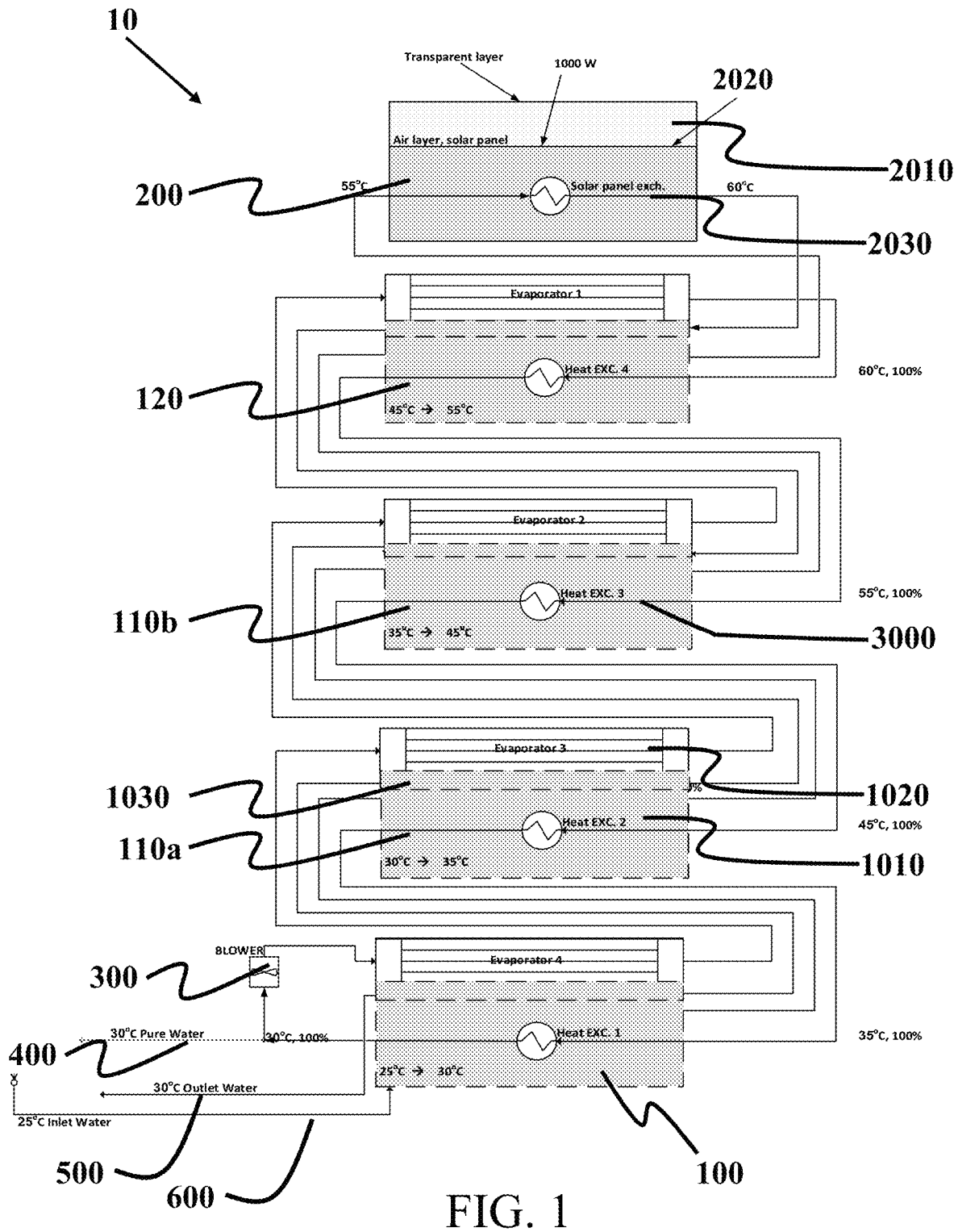
FIG. 1 presents a schematic drawing of one preferred embodiment of the invention.

In the following description, various aspects of the invention will be described. For the purposes of explanation, specific details are set forth in order to provide a thorough understanding of the invention. It will be apparent to one skilled in the art that there are other embodiments of the invention that differ in details without affecting the essential nature thereof. Therefore the invention is not limited by that which is illustrated in the figure and described in the specification, but only as indicated in the accompanying claims, with the proper scope determined only by the broadest interpretation of said claims.

As used herein, the term "contaminated water" is used to describe impure water that is susceptible to purification, particularly water that is not potable. Non-limiting examples of types of water that are included within the term thus include sea water, salt water, brine, brackish water, grey water, and black water.

As used herein, with reference to numerical quantities, the term "about" refers to a range of values ±20% of the nominal quantity.

As used herein, with reference to the location relative to a source of contaminated water the term "remote" refers to any location other than physically within or upon a body of contaminated water used as the source of water to be purified.

The instant invention provides an energy-efficient (in preferred embodiments, solar power based) humidification-dehumidification (HDH) method and system for purifying water.

The method comprises an air cycle and a water cycle. In the air cycle, air flows through a series of evaporation stages in which it encounters contaminated water flowing in the opposite direction, thereby entraining water vapor created by evaporation from the flowing water. The humid air then flows through a series of condensation stages each of which comprises a closed conduit surrounded by water that is colder than the humid air. The air dissipates heat to the colder water flowing around it, cooling it below its dew point and causing entrained water vapor to condense out as purified liquid water. In preferred embodiments of the invention, the dehumidified air is recirculated into the system. Typical air flow rates are on the order of 1 m/s; in preferred embodiments of the method, the air flow is directed and controlled by a fan or blower.

The water cycle takes place in tandem with the air cycle. In the water cycle, contaminated water, in preferred embodiments initially at ambient temperature, flows through the condensation stages in the direction opposite to the flow of humid air. The contaminated water absorbs heat from the air. The warm contaminated water that exits the final condensation stage flows through a solar water heater (solar collector), where is further heated. The contaminated water exiting the solar heater is thus at the maximum temperature in the system; in typical embodiments, it is heated to about 60° C. The contaminated water then flows back through the series of evaporator stages, where it heats up the air contacting it and flowing in the opposite direction, and humidifies the air which, as described above, entrains water vapor created by evaporation of water from the contaminated water flow. After passing through the final evaporator stage, the water is discharged from the system.

Reference is now made to FIG. 1, which presents a schematic diagram of a preferred embodiment 10 of a HDH water purification system of the instant invention that can be used to purify contaminated water by the method described above. The system comprises a water flow subsystem and an air circulation subsystem.

The water flow subsystem comprises a system water inlet 600 through which contaminated water enters the system; a system outlet 500 through which contaminated water exits the system after a portion thereof has been extracted and purified; a plurality of evaporator/condenser units (in the embodiment shown, it comprises four evaporator/condenser units: a first evaporator/condenser unit 100, two intermediate evaporator/condenser units 110*a* and 110*b*, and a final evaporator/condenser unit 120); and a solar collector 200 that utilizes solar radiation impinging thereon to heat a fluid. Each evaporator/condenser units is separately enclosed and is divided into an evaporator stage 1020 and a condenser stage 1010, with a divider 1030 separating them. In preferred embodiments of the invention, within each evaporator/condenser unit, the evaporator stage lies above the condenser stage. In preferred embodiments of the invention, the condenser stages are filled with contaminated water when the system is in used, while the evaporator stages are constructed such that a layer of water flows through them, the surface of which is in contact with air above the water flow.

The water flow subsystem is constructed such that when it is connected to a source of contaminated water, the contaminated water enters the system by passing via system water inlet 600 into the condenser stage 1010 of the first evaporator/condenser unit. The water exits this first condenser stage and then passes into the next condenser stage downstream, and so on, until it exits the final condenser stage. The outlet of a condenser stage may be connected to the inlet of the next downstream condenser stage by any means known in the art, either directly or via tubing (e.g. plastic tubing) rated for the maximum system pressure. The outlet of the condenser stage of the final evaporator/condenser unit is connected to an inlet of heat exchanger 200 that heats the water flowing therethrough. The heat exchanger may be of any appropriate type known in the art, and may use as a source of heat any heat source sufficient to heat the water to the desired temperature (typically about 60° C.). A non-limiting example of such a heat source is residual heat from waste hot water.

In preferred embodiments of the invention, the heat exchanger is a solar collector that transfers heat from solar radiation to a fluid in thermal contact with the solar collector. Any standard solar collector known in the art and appropriate for the instant invention may be used. In preferred embodiments of the invention, the solar collector comprises a transparent upper layer 2010, a layer of light absorbing material (in preferred embodiments, the material is black so as to absorb the maximum possible amount of sunlight) 2020, and a lower layer 2030 through which the water passes. In preferred embodiments of the invention, the solar collector has an area of about 1.7 m$^2$ (preferably having a square profile with a side of length 1.3 m$^2$).

The water flow outlet of the solar collector is connected (either directly or by tubing, preferably plastic tubing rated for use with drinking water) to the inlet of the evaporator stage of the final evaporator/condenser unit (i.e., the same stage from which contaminated water enters the solar collector). The water exits this final evaporator stage and then passes into the next evaporator stage downstream, and so on, until it exits the system via outlet of the evaporator stage of the first evaporator/condenser unit through system water outlet 500.

In preferred embodiments of the invention, the water flow subsystem is connected to pumping means that direct and control the rate of flow of water through the system.

The air circulation subsystem provides a flow of air opposite in direction to the flow of water through the water flow subsystem. Preferably, a blower 300 is used to direct and control the flow of air. In preferred embodiments of the invention, the air circulation system is constructed such that the air flows therethrough at a rate of about 1 m/s.

In the air circulation subsystem, air flows sequentially through the evaporator stages of the evaporator/condenser units from the first evaporator/condenser unit to the last. The air, flowing in the direction opposite to the flow of water through the evaporator/condenser units, becomes humidified as water evaporates from the water flow and the vapor is entrained in the flow of air. After exiting the evaporation stage of the final evaporator/condenser unit, the air flow passes into a conduit 3000 that passes through the condenser stage of the final evaporator/condenser unit. The conduit is in thermal contact with the water that is in the condenser stage, but is physically isolated therefrom and is impermeable to water such that none of the contaminated water can enter the conduit. The air flow then passes sequentially through the condenser stages (passing through a conduit in each case). As the humidified air cools, water vapor condenses to produce purified liquid water. The purified water is collected by collection means 400 connected to the downstream end of the conduit passing through the condenser stage of the first evaporator/condenser unit.

In preferred embodiments of the invention, the air circulation subsystem is a closed-loop system, and the air exiting the condenser stage of the first evaporator/condenser unit is thus returned to the evaporator stage of the first evaporator/condenser unit.

Figure 2:
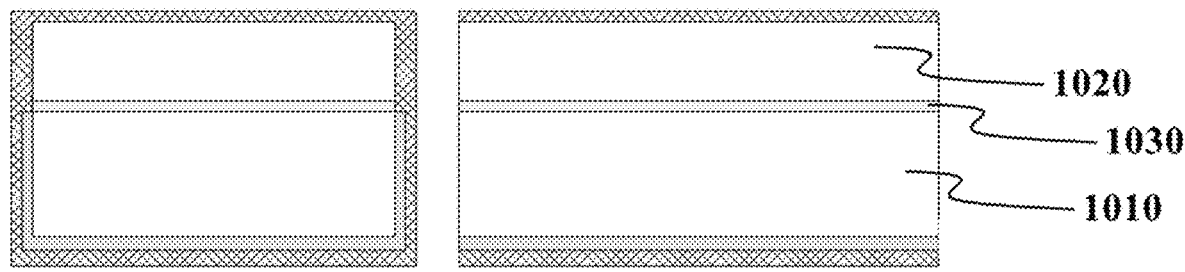
FIG. 2 presents a schematic side view of an evaporator/condenser unit.

Reference is now made to FIG. 2, which shows a schematic cutaway side view of a typical embodiment of an evaporator/condenser unit. The evaporator stage lies above the condenser stage and is separated from it by a divider, preferably made of plastic, and most preferably of polyethylene foam.

Figure 3A:
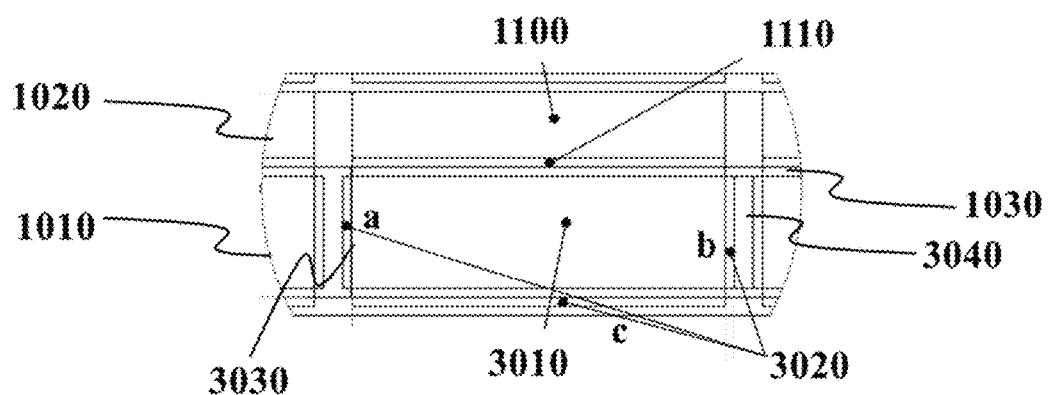
FIGS. 3A-3C present schematic views of a preferred embodiment of a condenser stage, showing its construction relative to the evaporator stage, a top view, and a detail of the top view showing the flow of water and air.

Reference is now made to FIG. 3A, which shows a cross-sectional view of a preferred embodiment of an evaporator/condenser unit. The evaporator unit 1020 comprises an evaporator air duct 1100 through which the air flows. The water flow 1110 occurs on the bottom inside surface of the evaporator unit. In preferred embodiments of the invention, the bottom inside surface of the evaporator unit is a thin polyethylene sheet, which sits on divider 1030. In typical embodiments, the distance from the bottom surface of the evaporator unit to the uppermost inner surface of the air duct is about 40 mm.

The condenser unit shown in the cross-sectional view of FIG. 3A comprises a conduit 3000 that comprises an air duct 3010 through which the air flows. The condenser unit further comprises water ducts 3020 along the sides of the air duct; in the embodiment shown, the water ducts are disposed along the sides (3020a, 3020b) and bottom (3020c) of the condenser air duct. The water flow ducts are separated from the air flow duct by a thin barrier 3030, preferably a thin polyethylene sheet that allows thermal contact between humid air flowing through the air duct and contaminated water flowing through the water ducts, but prevents physical contact so that the water condensing out of the humid air remains pure. An insulating layer 3040, which in preferred embodiments is made from hard plastic foam (e.g. polyethylene foam) provides the outer wall of the condenser water duct. In typical embodiments of the invention, the interior height of the condenser stage is about 70 mm, and the separation between thin barrier 3030 and insulating layer 3040 is about 5 mm.

Figure 3B:
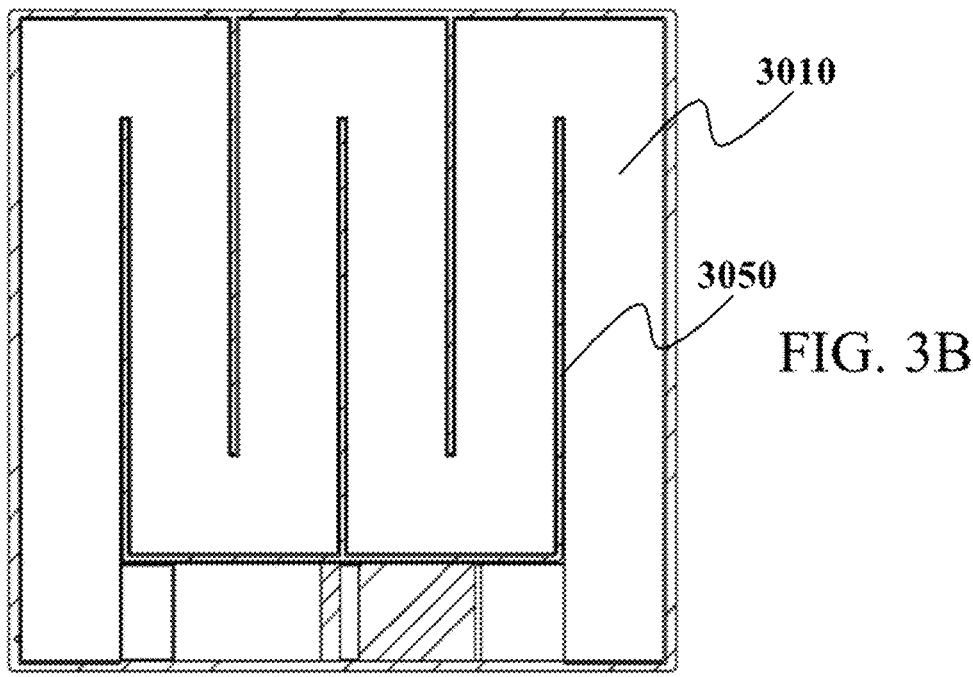
Figure 3C:
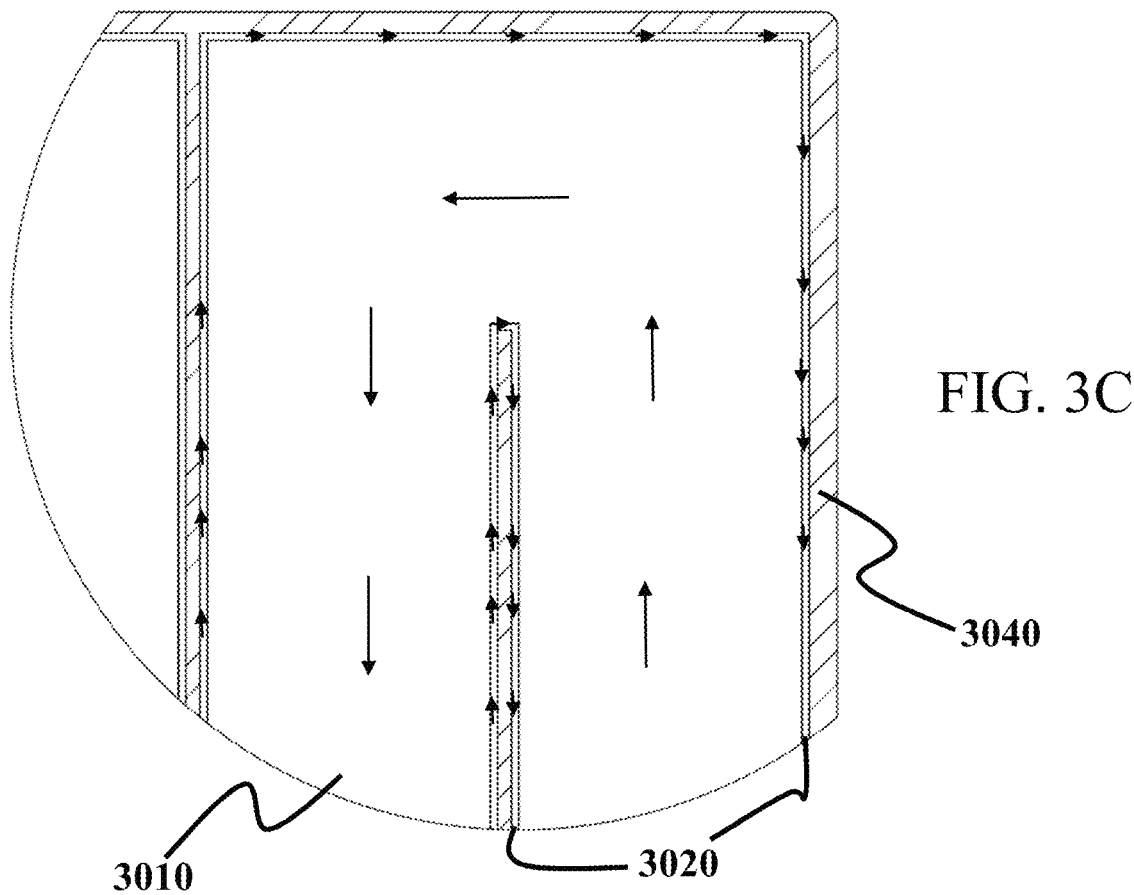

Reference is now made to FIG. 3B, which shows a top view of a preferred embodiment of conduit 3000. In order to increase the thermal contact area between the air flowing through the conduit and the water flowing through the water duct and the time that the air spends in any given condenser stage, the conduit comprises baffles 3050 along which the water ducts are disposed. The air is thus forced to flow in a serpentine path. In typical embodiments of the invention in which the evaporator/condenser unit is about 1.3 m on a side, the path width (i.e. the distance between opposing baffles) is about 200 mm, and the path through the condenser stage is about 7 m. A detailed top view of a portion of a condenser stage, in which arrows indicate the flow of air and water therethrough, is given in FIG. 3C.

In preferred embodiments of the invention, the evaporator stages are designed analogously such that the water and air flow in a serpentine path. In the most preferred embodiments, a serpentine pathway is created by a series of opposed baffles that force the flow along a serpentine path.

Figure 4:
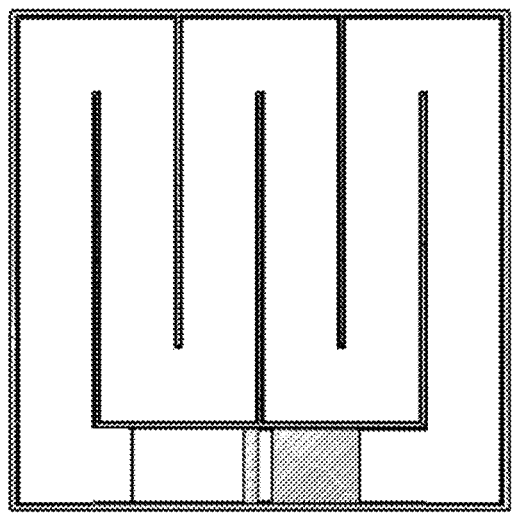
FIG. 4 presents a schematic drawing of a baffle system that directs serpentine air and water flow through some embodiments of the evaporator stage.

Reference is now made to FIG. 4, which presents a schematic overhead view of such an arrangement. In preferred embodiments of the invention in which the area of each evaporator/condenser unit is about 1.7 m$^2$, the effective air/water contact area in each evaporator stage is about 4 m$^2$, the path width (i.e. the distance between opposing baffles) is about 200 mm, and the effective path length through the series of baffles is about 7 m. In preferred embodiments of the invention, in a given evaporator/condenser unit, the baffles of the evaporator stage unit lie directly above those of the condenser stage.

Figure 5:
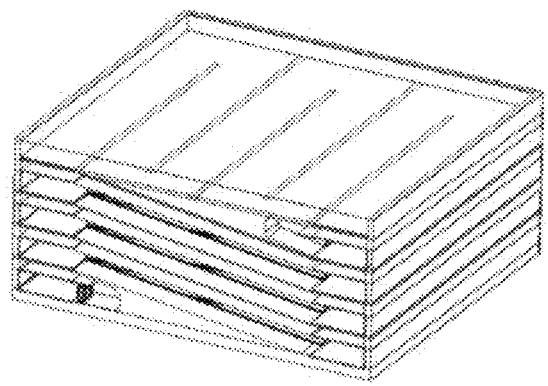
FIG. 5 presents a cutaway side view of one preferred embodiment of the invention; and, FIGS. 6A-6E present schematic views and graphs that illustrate a thermodynamic analysis of the method herein disclosed.

In preferred embodiments of the invention, the evaporator/condenser units are stacked one above the other below the solar collector, with the first stage and system water inlet and outlet as defined above at the bottom. In preferred embodiments of the invention, the conduits are oriented at an angle relative to the surface upon which the system rests such that the purified liquid water flows under the force of gravity from the final evaporator/condenser unit to the first one. In the most preferred embodiments of the invention, the evaporator/condenser units themselves are oriented at an angle relative to the surface upon which the system rests such that the purified liquid water flows under the force of gravity from the final evaporator/condenser unit to the first one. Reference is now made to FIG. 5, which presents a cutaway side view of one such embodiment, in which the system comprises 4 evaporator/condenser units and 1 solar collector. In these inventions, the system has a modular design in which evaporator/condenser units can be inserted and removed and hence replaced as needed.

In preferred embodiments of the invention, the entire system except for the blower is made of non-metallic materials, preferably plastics. As non-limiting examples of structural materials that can be used, the structural members can be made of rigid polyethylene or polystyrene foam; the dividers from 0.15 mm thickness low-density polyethylene foam; and the upper and heat-absorbing layers of the solar collector from 0.25 mm thickness low-density polyethylene. When the system is constructed from plastics, a system having a 1.7 m$^2$ area, 4 evaporator/condenser units, and 1 solar collector will have a total net weight of less than 11 kg.

Thus, in contrast to systems known in the art, which are large and unwieldy and must sit on the body of contaminated water from which they draw water to be purified, the instant invention is fully modular and completely portable and can be used remote from the source of contaminated water, for example, the system can be located, and the method performed, on land as easily as directly on a body of water. Moreover, operation of device and method disclosed herein is independent of the input water supply pressure, since the external water supply is only used to refill the condenser stages. The device is hydrostatically stable, and experiences no pressure greater than that caused by the water level itself (ca. 0.1 bar). Additional advantages of the instant invention will be clear to one of ordinary skill in the art.

Example 1

The following non-limiting thermodynamic analysis is presented in order to illustrate some important design considerations for putting the invention disclosed herein into practice.

With regard to the condensation stages, the First Law of Thermodynamics (eq 1) must hold true:

$$\dot{Q} = \dot{W} + \Sigma \dot{m}_e h_e - \Sigma \dot{m}_i h_i \tag{1}$$

where $\dot{Q}$ is the heat loss rate, $\dot{W}$ is external work done on the system, $\Sigma \dot{m}_i h_i$ is the sum of products of all inlet mass flow rates by each flow's enthalpy into the system, and $\Sigma \dot{m}_e h_e$ is sum of products of all outlet mass flow rates by each flow's enthalpy out of the system. Since no external work is being done on the system, and assuming that heat loss to the environment is negligible, $\dot{Q} = \dot{W} = 0$, and $\Sigma \dot{m}_i h_i = \Sigma \dot{m}_e h_e$. Eq 1 can thus be rewritten explicitly for the inventive system herein disclosed as eq 2, $$\dot{Q} = \dot{m}_w c_{P_w} T_{w1} + \dot{m}_{air} h_{15} = \dot{m}_w c_{P_w} T_{w5} + \dot{m}_{air} h_{19} + \dot{m}_L h_L \tag{2}$$

where $\dot{m}_w$ is the flow rate of contaminated water, $\dot{m}_{air}$ is the flow rate of air, $\dot{m}_L$ is the flow rate of purified water, $c_{P_w}$ is the specific heat capacity of water, $T_{w1}$ is the water temperature at the inlet to the system, $T_{w5}$ is water temperature at the outlet from the system, $h_{15}$ is the air enthalpy at the outlet from the evaporator, $h_{19}$ is the air enthalpy at the outlet from the condenser, and $h_L$ is the enthalpy of the purified water. Neglecting $\dot{m}_L h_L$, which is an order of magnitude smaller than the other terms, eq 2 can be rearranged to yield eq 3:

$$\dot{m}_{air}(h_{15} - h_{19}) = \dot{m}_w c_{P_w}(T_{w5} - T_{w1}) \tag{3}$$

In addition, mass conservation requires that $\dot{m}_{w1} = \dot{m}_{w5} = \dot{m}_w$; $\dot{m}_{air15} = \dot{m}_{air19} = \dot{m}_{air}$; and $\dot{m}_{v15} = \dot{m}_{v19} + \dot{m}_L$, where $\dot{m}_v$ is the vapor mass flow rate.

Substituting the water vapor mass flow rate with the absolute specific humidity ω of the air, eq 3 can be rewritten as eq 4:

$$\dot{m}_L = \dot{m}_{air}(\omega_{15} - \omega_{19}) \tag{4}$$

Heat loss from the air within the condenser is given by eq 5:

$$\dot{Q}_{air} = \dot{m}_{air}(h_{15} - h_{19}) \tag{5}$$

Humid air enthalpy is defined as the sum of dry air enthalpy and the relative water vapor enthalpy by its partial pressure fraction (eq 6):

$$h_{air} = c_{P_a} \times T + \omega \times (h_{fg0} + c_{P_v} \times T) \tag{6}$$

where $h_{fg0}$ is the latent heat of water.

The amount of heat added to the water within the condenser is given by eq 7:

$$\dot{Q}_w = \dot{m}_w c_{P_w}(T_5 - T_1) \tag{7}$$

Heat transfer in the condensation stage, which acts as a cross flow heat exchanger, is governed by the conduction equation (eq 8):

$$\dot{Q} = UA\Delta T \tag{8}$$

where U is the overall heat transfer coefficient between water and air in the condenser, A is the contact surface area (which is a design parameter of the system), and ΔT is the mean temperature difference between the fluids.

Figure 6A:
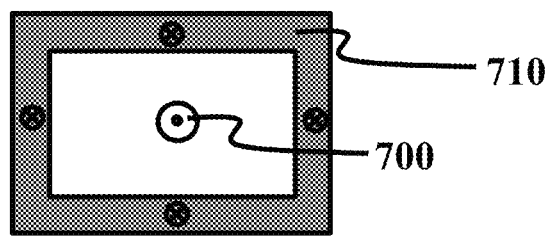

U can be evaluated using condensation heat transfer analysis. Reference is now made to FIG. 6A, which presents a schematic cross-sectional view of a rectangular channel having a double-walled structure, in which there is a flow 700 of warm air. A flow 710 of colder water in a counter-flow stream proceeds through the wall cavity. Heat transferred from the warm and humid air to the water through the walls enables condensation to occur.

The average heat transfer coefficient between the air and water is given in equation (9) (see J. P. Holman, *Heat Transfer*, McGraw-Hill 2001 Metric Edition, Chapter 9, which is incorporated herein by reference):

$$\bar{h} = 0.943 \left[ \frac{\rho(\rho - \rho_v) g h_{fg} k_f^3}{4 L \mu_f (T_g - T_w)} \right]^{0.25} \tag{9}$$

This equation is derived under the assumptions that the walls have negligible thermal resistance; the temperature differential between the wall and air is constant; the air velocity is low; and the condensate water layer flows slowly down the surface ("film condensation").

Assuming a constant temperature differential between the air and the water and using the LMTD method, which is common for cross flow heat exchangers, the effective ΔT is the difference between the air and water temperatures at any point in the condenser, for example at the inlet.

Eqs 1-5 and 9 are the constitutive expressions for evaluating the performance and operating point for the condenser.

We can perform a similar analysis is for the evaporator stage.

Heat gained by air flow through the evaporator is given by eq (10):

$$\dot{Q}_{air} = \dot{m}_{air}(h_{15} - h_{11}) \tag{10}$$

where the enthalpy of moist air is evaluated using eq 6 above.

Heat released from the water is given by eq 11:

$$\dot{Q}_w = \dot{m}_w c_{P_w}(T_{10} - T_6) \tag{11}$$

where $T_6$ is the temperature of the water at the entrance to the evaporator stage and $T_{10}$ is the temperature at the exit from the evaporator stage.

Heat transfer between the water and air in the evaporator is governed by eq 12:

$$\dot{Q} = UA'\Delta T \tag{12}$$

where U is the overall heat transfer coefficient between water and air in the condenser, A' is the contact surface area (which is a design parameter of the system), and ΔT is the mean temperature difference between the fluids.

U can be evaluated using empirical correlations from the literature. It should be noted that heat transfer here is combined of forced convection and evaporation, which yields a much higher overall heat transfer coefficient than forced convection alone.

Another important governing equation which relates to the evaporator describes the evaporation rate. Evaporation of water is driven mainly by the partial pressure difference between the vapor saturation pressure and actual water partial pressure in the surrounding air. If air flows over the surface of the water, the evaporation rate is also related to the air velocity.

The evaporation rate from an undisturbed water surface over which air flows in a closed channel is given by eq 13, an empirical correlation given in Raimundo, A. M.; Gaspar, A. R.; Virgilio, A.; Oliveira, M.; and Quintela, D. A., "Wind tunnel measurements and numerical simulations of water evaporation in forced convection airflow," *Int. J. Therm. Sci.*, 24 Jun. 2014, which is incorporated in its entirety by reference:

$$J_w = 10^3 \times (1.05 + 10.32 V_a)(C_{B,w} - C_{B,in}) \tag{13}$$

where $J_w$ is the evaporation rate in kg/m²·h; $V_a$ is the air velocity in m/s; $C_{B,w}$ is the water vapor mass fraction in the air at the air-water interface; and $C_{B,in}$ is the water vapor mass fraction in the at the inlet to the channel.

The surface area A in equation (8) must also satisfy the demand for an evaporation rate as defined by equation (2).

Equations (10) to (13) are the constitutive expressions for evaluating the performance and operating point for the evaporator.

The evaporator is designed as an open heat exchanger where counter-flows of air over water exchange mass and heat. Two heat transfer processes occur in the evaporator: heat transfer from the warm water to the colder air flow, and heat transfer to the water surface to enable evaporation.

Water to air heat transfer is important in order to ensure the air is heated to as high a temperature as possible as it leaves the evaporator, so that maximum condensation can occur in the condenser. A sufficiently high heat transfer coefficient between the water surface and air flow is essential for this purpose.

Heat transfer within the water must satisfy the thermodynamic conditions necessary to enable the desired mass transfer involved in evaporation, i.e. to heat the water surface. This heat transfer occurs via natural convection and eddy currents within the water flow.

Figure 6B:
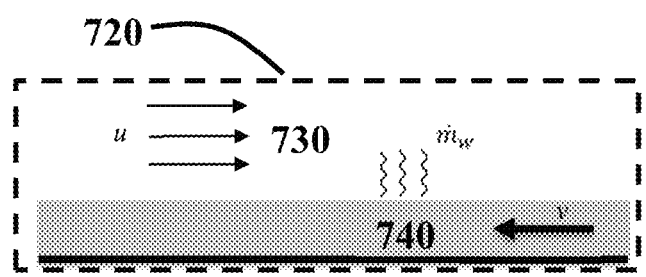
Figure 6C:
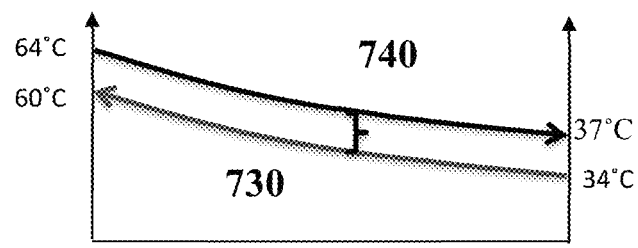

Reference is now made to FIG. 6B, which schematically illustrates a water surface over which a stream of air flows. We define a control volume 720 that includes the water body and air flow over it. Typical inlet and outlet temperature profiles for the air flow 730 and the water flow 740 are illustrated graphically in FIG. 6C. A constant temperature differential is assumed between the flows along the flow path. That being the case, it is unlikely that the heat required for evaporation will originate from the air flow, and it should be assumed that the heat will come from within the water flow itself e.g. via eddy currents. This heat transfer will therefore not affect the air temperature.

The heat transfer coefficient between the air flow and water can be evaluated using standard correlations for flow in closed channels and tubes. For the case where the fluid is heated, one may use, for example, use the Dittus-Boelter correlation, eq 14:

$$Nu = 0.023 Re^{0.8} Pr^{0.4} \quad (14)$$

where Nu is the Nusselt number at the water-air boundary, Re is the flow Reynolds number and Pr is the air Prandtl number. The heat transfer coefficient can then be calculated from eq (15)

$$h = \frac{Nu \cdot k}{D_H} \quad (15)$$

where k is the air thermal conductivity and $D_H$ is the channel's hydraulic diameter.

The correlation given in eq 14 was reported in the literature to have an accuracy of up to ±25%. The underlying assumptions are a that the flow is a fully developed turbulent flow in smooth tubes, the fluid Prandtl number is in the range 0.6 to 100, and that there is only a moderate temperature difference between the wall and fluid conditions.

An alternative correlation to be used with better reported accuracy is the Petukhov and Gnielinski correlation for fully developed turbulent and transition flow in tubes, eq 16, $$Nu_0 = \frac{(f/8)(Re-1000)Pr}{1+12.7(f/8)^{1/2}(Pr^{2/3}-1)}\left[1+\left(\frac{D}{L}\right)^{2/3}\right] \quad (16)$$

where the pipe friction coefficient f is given by eq 17:

$$f = \frac{1}{(1.82 \log Re - 1.64)^2} \quad (17)$$

This correlation is valid for Pr>0.7 and Re>2300, and may be used for a constant wall temperature or constant wall heat flux with reasonable accuracy.

Figure 6D:
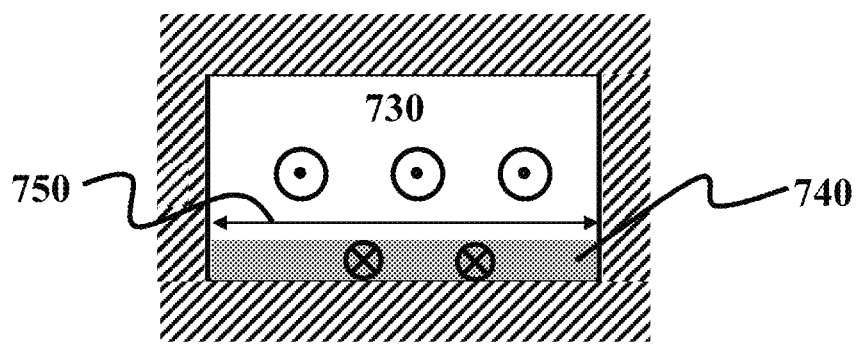

In applying the either of the above correlations it is assumed that the air viscosity remains constant along the path. This is a reasonable assumption for the air temperature range typically found in the instant invention. In addition, the correlations above were developed for a case where heat is transferred through the entire inner surface area of the pipe or duct. In our case, on the contrary, heat transfer occurs only between the water surface and air, i.e. only along one wall of the channel's internal surface, as illustrated in FIG. 6D. This is under the assumption that the duct walls are thermally insulated. The effective heat transfer coefficient is therefore evaluated by calculating $D_H$ in eq 15 such that $$D_H = b/\pi \quad (18)$$

where b is the width of the duct 750.

The main factor affecting the heat transfer coefficient is the air velocity. This effect is approximately linear. A velocity range of 0.5-3.0 m/s is desirable. Increasing air velocity has a negative effect, though, as it will increase pressure drops in the system and that in turn will require more powerful air blower or fan.

The required fan size and power consumption can be estimated by evaluating the pressure drop along the air cycle. Since the fan is expected to be the main electric power consumer in the method and system herein disclosed, optimizing the fan size will help to limit the costs involved in construction and use of a system for purifying water as disclosed herein.

It is assumed that the relative air pressure drop $\Delta P/P$ (and hence the relative air density $\Delta\rho/\rho$) in the system is small and hence the fluid may be considered incompressible.

The major losses in a pipe or duct for a turbulent flow are can be estimated by using eq 19:

$$h_l = f \frac{L}{D} \frac{V^2}{2} \quad (19)$$

where f is the friction factor, evaluated from the Moody diagram, L is the pipe length, D is the pipe diameter and V is the average air velocity.

Minor losses in the piping system include bends, turns, valves, orifices etc. The main components in preferred embodiments of the system disclosed herein are 180° turns in each layer's serpentine path, as shown in FIG. 3, and 90° bends at the inlet and outlet of each layer. These losses are evaluated by using an effective length Le/D, replacing the term L/D in eq 19. Effective length values for standard restrictions, based on measurements, are given in the literature.

Eq 19 indicates that the system pressure drop is governed mainly by the air velocity or flow rate due to the exponential dependency on air velocity.

The solar heater can be analyzed separately. The heat transferred to the water within the solar heater, assuming a well-insulated system, is given by eq 20:

$$\dot{Q}_s = \dot{m}_w c_{P_w}(T_6 - T_5) \quad (20)$$

where $T_6$ is the water temperature at the outlet of the solar heater and $T_5$ is the water temperature at the inlet to the solar heater.

Example 2

The constitutive equations given in the previous example can be used to predict the system performance, its sensitivity to parameter changes and the desirable design parameters. A trial and error calculation is required in order to find a working point that satisfies all equations.

Figure 6E:
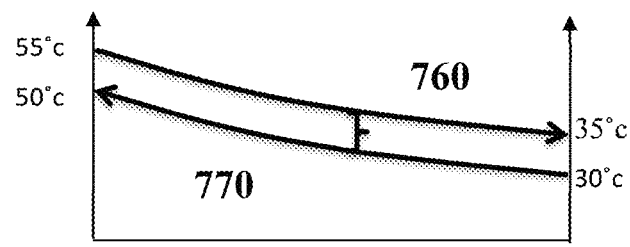

The calculation is made using the following basic assumptions:

1. The solar power input to the solar heater is 1000 W.
2. A uniform temperature differential exists across the condenser and evaporator between air and water. Reference is now made to FIG. 6E, which illustrates graphically a typical temperature distribution of air 760 and water 770 in the condensation stage. In each cross section along the condenser, the temperature difference between air and water is constant. This is a reasonable assumption for a relatively long heat exchanger with low flow rates and a small temperature difference between the fluids.
3. The system is well insulated with negligible heat losses to and from the environment.
4. Air and water channels having oblong cross sections with hydraulic diameters of 100 mm are used. This size is in fact quite convenient size for use in a practical system.

In the calculations performed in this example, the overall heat transfer coefficient in the condenser was taken to be 55 W/m²·K, based on preliminary calculations and measurements. The overall heat transfer coefficient in the evaporator was calculated to be U=80 W/m²·K.

The evaporation rate matches the demand for the amount of fresh water produced assuming an air velocity of at least 1.3 m/s, which in turn can be used to evaluate the pressure drop across the air path. This pressure drop is used to select an appropriate fan.

We start the calculation with an initial guess for the water inlet temperature to the solar heater and required water flow rate. We then calculate water temperature at the outlet of the solar heater. These parameters are then used to calculate the amount of heat transferred from the water to the air within the evaporator. Assuming certain air inlet properties and flow rate to the evaporator, the outlet air properties can be estimated. Once all air and water conditions are known, a calculation of the heat balance in the condenser is then performed. If balance is not achieved, the calculation is restarted with corrected values until convergence is achieved. In parallel, the evaporator surface area is checked against the desirable evaporation rate.

A typical solution for one embodiment of the invention is given in Tables 1 and 2 for the condenser and evaporator calculations, respectively.

TABLE 1

Condenser calculations

| m_L | 4.50E+00 | kg/hr | Required fresh water output | | | | |
| | 1.25E-03 | Kg/s | | | | | |

| Air flow | | | | Water flow | | | |
| --- | --- | --- | --- | --- | --- | --- | --- |
| T15 | 60 | deg c. | Air inlet temp | T1 | 30 | deg c. | Water inlet temp |
| T19 | 33.5 | deg c. | Air outlet temp | T5 | 56.5 | deg c. | Water outlet temp |
| Ps15 | 20779.08 | Pa | Saturation vapor pressure | Cp water | 4180 | KJ/Kq K | Average water |
| Psi 9 | 4736.254 | Pa | Saturation vapor pressure | | | | thermal capacity |
| ω15 | 0.157445 | Kg w/Kg a | Specific humidity | | | | across the |
| ω19 | 0.032134 | Kg w/Kg a | Specific humidity | | | | temperature range |
| m_a | 0.009975 | Kg/s | Air mass flow in condenser | h1 | 125.718 | KJ/KG | Water inlet enthapy |
| h15 | 472.2338 | KJ/KG | Air inlet enthapy | h5 | 236.6444 | KJ/KG | Water outlet enthalpy |
| h19 | 116.1565 | KJ/KG | Air outlet enthapy | | 3.556928 | | |
| Q_air | -3.55192 | KW | Air heat loss in the condenser ⇒ | m_w | 0.032066 | Kg/s | Water flow rate in the condenser |

| Required heat trasfer area | | | |
| --- | --- | --- | --- |
| U | 55 | W/m2K | Overall heat transfer coefficient between water and air (from the literature) |
| ΔT | 3.5 | deg.c | Average temperature differential between air and water |
| A | 18.45 | m2 | Required heat transfer surface area |
| DH | 0.1 | m | Taraet hydraulic diameter |
| a | 0.2 | m | Section long side |
| b | 0.07 | m | Section short side |
| DH | 0.103704 | | Channel hydraulic diameter |
| P | 0.54 | m | Heat transfer perimeter |
| L | 34.16946 | m | Require heat transfer length |

TABLE 2

Evaporator calculations

| Air flow | | | | Water flow | | | |
|---|---|---|---|---|---|---|---|
| T11 | 33.5 | 60 dea c. | Air inlet temp | T6 | 63.961 | deg c. | Water inlet temp |
| T15 | 60 | 60 dea c. | Air outlet temp | T10 | 37.461 | deg c. | Water outlet temp |
| Ps11 | 4736.254 | Pa | Saturation vapor pressure | Cp_water | 4180 | KJ/Ka K | Average water thermal capacity across the temperature range |
| Ps15 | 20779.08 | Pa | Saturation vapor pressure | | | | |
| ω11 | 0.032134 | Kg_w/Kg_a | Specific humidity | h6 | 267.8753 | KJ/KG | Water inlet enthapy |
| ω15 | 0.157445 | Kg_w/Kg_a | Specific humidity | h10 | 156.949 | KJ/KG | Water outlet enthapy |
| m_a | 0.009975 | Kg/s | Air mass flow in condenser | m_w | 0.03207 | Kg/s | Water flow rate in the evaporator |
| h11 | 116.0551 | KJ/KG | Air inlet enthapy | | | | |
| h15 | 471.5466 | KJ/KG | Air outlet enthapy | | | | |
| Q_air | 3.54607 | KW | Air heat gain in the evaporator ⇐ | | | | |

| Required heat transfer area | | | | Solar water heater | | | |
|---|---|---|---|---|---|---|---|
| U | 80 | W/m2 K | Overall heat transfer coefficient between water and air (from the literature) | Q heater | 1000 | W | Solar energy available for heating water |
| | | | | T5 | 56.5 | deg c. | Water inlet temperature to solar heater |
| ΔT | 3.961 | deg c. | Average temperature differential between air and water | ΔT | 7.461 | deg c. | Temperature differential for a given flow rate and solar power |
| A | 11.19 | m2 | Required heat trasfer surface area | T6 | 63.961 | deg c. | Water outlet temperature from solar heater |
| DH | 0.1 | m | Tweet hydraulic diameter | | | | |
| a | 0.2 | m | Section lona side | | | | |
| b | 0.07 | m | Section short side | | | | |
| DH | 0.103704 | | Channel hydraulic diameter | | | | |
| P | 0.2 | m | Heat transfer oerimeter | | | | |
| L | 55.95289 | m | Require heat transfer length | | | | |

Using the common definition of G.O.R (Gained Output Ratio), namely, kg of water produced per 2326 kJ of heat consumed, in this numeric example this gain value is calculated to be:

$$G.O.R = \frac{1.25 \times 10^{-3} \times 2326 \times 10^{-3}}{1000} = 2.90$$

The fresh water output rate is 4.5 kg/h or 1.25×10-3 kg/s and the absorbed solar energy is 1000 W.

This example shows that the proposed system structure, based on a reasonable size evaporator and condenser, and the expected solar power, can produce excellent performance.

Example 3

The following non-limiting example is given to illustrate how one embodiment of the instant invention may be used in practice, and is intended to enable a person of ordinary skill to understand the principles of its operation.

The condenser stages cool down the moist air, thereby condensing water vapor as purified water and thereby extracting heat from the air flow. The contaminated water in the condenser stage is thereby heated. Because the condenser stage is in thermal contact with the evaporator stage of that stage, some of the heat will also be transferred to the evaporator stage, thereby increasing the rate of evaporation of contaminated water flowing therethrough.

The solar collector heats up contaminated water in the top layer prior to its flowing through the evaporator stages of the evaporator/condenser units. In typical embodiments of the invention, the solar collector adds on the order of 1 kW of energy to the system.

In the evaporator stages, the flowing water contacts the counter-flowing air. At least part of the flowing water evaporates, humidifying the air. The evaporation process cools the water and heats the air.

In a typical embodiment of the invention, contaminated water enters the first condenser stage at a temperature of ~25° C. It is warmed in the first stage to ~30° C., in the stage stage to ~35° C., in the third stage to ~45° C., and in the fourth stage to ~55° C. The water exits the solar collector at a temperature of ~60° C. As the water flows through the evaporation stages, it cools down, and exits the system at a temperature of ~30° C. The air, flowing at about 1 m/s, is heated to ~60° C. as it flows through the evaporator stages and then cools down to ~30° C. as it flows through the condenser stages.

Under these conditions, a daily supply of 1600 liters of contaminated water will yield at least 36 liters/day of pure water.

The invention claimed is:

1. A humidification-dehumidification (HDH) water purification system, comprising:
  a water flow subsystem comprising:
    a system water inlet (600);
    a system water outlet (500);
    a plurality of evaporator/condenser units, each of which comprises a condenser stage (1010), an evaporator stage (1020), and a divider (1030) disposed between said condenser stage and said evaporator stage;
    at least one heat exchanger (200) configured to transfer heat generated externally to said water purification system to a fluid in thermal contact with said heat exchanger; and,
    a pure water exit (400) configured for collecting purified water; and,
  an air circulation subsystem in fluid connection with said pure water exit, said air circulation subsystem comprising:

a blower (300); and, conduits (3000) passing through each of said condenser stages and in fluid connection with said blower such that said blower is configured to direct a flow of air sequentially through each said evaporator stage from a first evaporator/condenser unit through a final evaporator/condenser unit and then sequentially through each of said conduits from said final evaporator/condenser unit to said first evaporator/condenser unit;

wherein:

said water flow subsystem is configured such that said plurality of evaporator/condenser units and said heat exchanger are interconnected so as to conduct water from said system water inlet through said condenser stages to said heat exchanger and then from said heat exchanger sequentially through said evaporator stages to said system water outlet;

said air circulation subsystem is configured to circulate air sequentially through said evaporator stages in a direction opposite to a direction in which said water flow subsystem is configured to conduct water and such that air flowing through said evaporator stages can make physical contact with water being conducted through said evaporator stages, and then sequentially through said condenser stages; and, said pure water exit interconnected with said air circulation system so as to conduct said purified water from said condenser stages to said pure water exit.

2. The HDH water purification system according to claim 1, wherein:

said plurality of evaporator/condenser units comprises:

said first evaporator/condenser unit (100) connected to said system water inlet and said system water outlet;

at least one intermediate evaporator/condenser unit (110); and, said final evaporator/condenser unit (120) in fluid connection with said heat exchanger;

said pure water exit for collecting purified water is in fluid connection with a downstream end of said conduit passing through said condenser stage of said first evaporator/condenser unit; and, said plurality of evaporator/condenser units and said heat exchanger are interconnected so as to conduct water through said HDH water purification system from said system water inlet sequentially through said condenser stages of said plurality of evaporator/condenser units from said first evaporator/condenser unit to said final evaporator/condenser unit, from said final evaporator/condenser unit to said heat exchanger, from said heat exchanger sequentially through said evaporator stages of said plurality of evaporator/condenser units, from said final evaporator/condenser unit to said first evaporator/condenser unit, and from said first evaporator/condenser unit to said system water outlet.

3. The HDH water purification system according to claim 1, wherein, in each of said condenser stages, said conduit comprises:

an air duct (3010) for conducting air;

at least one condenser water duct (3020) disposed along at least one side of said air duct;

a thin barrier (3030) between said air duct and said condenser water duct, said thin barrier configured to prevent physical contact but to allow thermal contact between air in said air duct and water in said condenser water duct; and, an insulating layer (3040) disposed on a side of said condenser water duct away from said air duct, thereby creating along with said thin barrier a duct through which water can flow.

4. The HDH water purification system according to claim 1, wherein said heat exchanger comprises at least one solar collector configured to utilize solar radiation impinging thereon to heat a fluid.

5. The HDH water purification system according to claim 1, wherein said plurality of evaporator/condenser units are configured in a stack beneath said heat exchanger.

6. The HDH water purification system according to claim 1, wherein said conduits are oriented at an angle relative to a surface upon which said system is resting such that condensed water vapor flows through said conduits under the force of gravity.

7. The HDH water purification system according to claim 1, wherein said air circulation subsystem is a closed-loop system.

8. The HDH water purification system according to claim 1, wherein at least one stage selected from the group consisting of said evaporator stages and said condenser stages is configured so as to conduct air and water through said at least one stage in a serpentine path.

9. The HDH water purification system according to claim 1, wherein at least one of the following is being held true: (a) said evaporator stages comprise a plurality of baffles configured to direct air and water flow through an evaporator stage in a serpentine path; (b) said evaporator stage and said condenser stage within each of said plurality of evaporator/condenser units are in thermal contact through said divider; (c) said system comprises 4 evaporator/condenser units and 1 solar collector; (d) each of said evaporator stages is characterized by an air-water contact area of 4 m$^2$; (e) said at least one solar collector comprises a transparent upper layer and a light-absorbing surface beneath said transparent layer; (f) each of said dividers is constructed of polyethylene foam; or any combination thereof.

10. The HDH water purification system according to claim 1, wherein except for said blower, said system is constructed of plastic.

11. The HDH water purification system according to claim 1, wherein at least one of the following is being held true: (a) said air circulation system is configured to provide an airflow speed of 1 m/s; (b) said at least one solar collector has an area of about 1.7 m$^2$; (c) said system additionally comprises pumping means for directing said flow of water through said system; or any combination thereof.

12. The HDH water purification system according to claim 1, wherein at least one of the following is being held true: (a) said system is a standalone unit that is configured to operate remote from a source of contaminated water; and (b) said plurality of evaporator/condenser units are modular.

13. A method for purifying contaminated water, comprising:

providing a water sequential flow subsystem comprising:

a system water inlet (600);

a system water outlet (500);

a plurality of evaporator/condenser units, each of which comprises a condenser stage (1010), an evaporator stage (1020), and a divider (1030) disposed between said condenser stage and said evaporator stage;

at least one heat exchanger (200) configured to transfer heat generated externally to said water purification system to a fluid in thermal contact with said heat exchanger; said plurality of evaporator/condenser units and said heat exchanger interconnected so as to conduct water from said system water inlet through said condenser stages to said heat exchanger and then from said heat exchanger sequentially through said evaporator stages to said system water outlet;

a pure water exit (400) configured for collecting purified water; and, an air circulation subsystem in fluid connection with said pure water exit, said air circulation subsystem comprising:

a blower (300); and, a conduit (3000) passing through each of said condenser stages and in fluid connection with said blower such that said blower is configured to direct a flow of air sequentially through each evaporator stage from a first evaporator/condenser unit through a final evaporator/condenser unit and then sequentially through each of said conduits from said final evaporator/condenser unit to said first evaporator/condenser unit;

said pure water exit interconnected with said air circulation system so as to conduct said purified water from said condenser stages to said pure water exit;

flowing contaminated water from a system water inlet through said plurality of condenser stages to said at least one heat exchanger configured to transfer heat to a fluid in thermal contact with said at least one heat exchanger;

flowing said contaminated water through said at least one heat exchanger;

flowing said contaminated water from said at least one heat exchanger through said evaporator stages;

flowing air in a sequential manner through said evaporator stages in a direction opposite to the flow of said contaminated water, said air flowing through said evaporator stages making physical contact with water being conducted through said evaporator stages;

entraining water vapor evaporated by said contaminated water in said evaporator stages in said air, thereby creating humidified air;

flowing said humidified air from said evaporator stages sequentially through said condenser stages via said conduits passing therethrough in a direction opposite to the flow of contaminated water therethrough, thereby cooling said air, condensing at least a part of said water vapor entrained therein as purified liquid water, and creating dehumidified air; and, collecting said purified liquid water.

14. The method according to claim 13, wherein:

said step of flowing contaminated water through said condenser stages to said at least one heat exchanger comprises flowing contaminated water through said condenser stages to at least one solar collector;

said step of flowing said contaminated water through said at least one heat exchanger comprises flowing said contaminated water through said at least one solar collector; and, said step of flowing said contaminated water from said at least one heat exchanger through said evaporator stages comprises flowing said contaminated water from said at least one solar collector through said evaporator stages.

15. The method according to claim 13, wherein said step of providing said conduit comprises providing, in each of said plurality of condenser stages, said conduit comprising:

at least one condenser water duct (3020) disposed along at least one side of an air duct (3010);

a thin barrier (3030) between said air duct and said condenser water duct, said thin barrier configured to prevent physical contact but to allow thermal contact between air in said air duct and water in said condenser water duct; and, an insulating layer (3040) disposed on a side of said condenser water duct away from said air duct, thereby creating along with said thin barrier a duct through which water can flow.

16. The method according to claim 13, further comprising orienting said conduits at an angle relative to a surface upon which said system is resting such that said purified liquid water flows through said conduits under the force of gravity.

17. The method according to claim 13, further comprising configuring said plurality of evaporator/condenser units in a stack, said stack of said plurality of evaporator/condenser units beneath said heat exchanger.

18. The method according to claim 17, further comprising orienting said stack of said plurality of evaporator/condenser units at an angle relative to a surface upon which said system is resting such that condensed water vapor flows through said conduits under the force of gravity.

19. The method according to claim 13, further comprising at least one step selected from a group consisting of (a) configuring at least one stage selected from a group consisting of said evaporator stages and said condenser stages such that flow through said at least one stage will follow a serpentine path; (b) recirculating at least part of said dehumidified air through said evaporator stages; (c) in each of said plurality of evaporator/condenser units, providing thermal contact between said evaporator stage and said condenser stage through said divider; (d) flowing said contaminated water and contaminated air through a system comprising 4 evaporator/condenser units and 1 solar collector; or any combination thereof.

20. The method according to claim 19, wherein said evaporator stages comprise a plurality of baffles configured to direct air and water flow through an evaporator stage in a serpentine path.

21. The method according to claim 14, wherein at least one of the following is being held true (a) said steps of flowing water through said evaporator stages and flowing air through said evaporator stages comprises flowing said water and said air through said evaporator stages characterized by an air-water contact area of 4 $m^2$; (b) said at least one solar collector comprises a transparent upper layer and a light-absorbing surface beneath said transparent layer; (c) all steps of said method are performed remote from a source of contaminated water; (d) each said divider being constructed of polyethylene foam; and (e) said steps of flowing air comprise flowing said air at an airflow speed of 1 m/s.

* * * * *